United States Patent [19]

Lupo et al.

[11] Patent Number: 5,095,434
[45] Date of Patent: Mar. 10, 1992

[54] MOTOR VEHICLE DRIVE CONTROL SYSTEM

[75] Inventors: Giorgio Lupo, Rivalta; Giovanni Tornatore, San Benigno Canavese; Mario Montuschi, Turin; Gian M. Pigozzi, Brescia; Alberto Norzi, Turin; Giorgio Cortesi, Brescia, all of Italy

[73] Assignee: Iveco Fiat S.p.A., Turin, Italy

[21] Appl. No.: 463,405

[22] Filed: Jan. 11, 1990

[30] Foreign Application Priority Data

Jan. 13, 1989 [IT] Italy .............................. 67014-A/89
Dec. 18, 1989 [IT] Italy .............................. 68114-A/89

[51] Int. Cl.$^5$ .............................................. B60K 41/18
[52] U.S. Cl. .................................. 364/424.1; 74/866
[58] Field of Search ............. 364/424.1; 74/335, 866, 74/337; 475/133

[56] References Cited

U.S. PATENT DOCUMENTS 4,527,679 7/1985 Hamada .
4,977,992 12/1990 Ohtsuka et al. ................... 364/424.1
4,981,202 1/1991 Leigh-Monstevens et al. ...... 74/335

FOREIGN PATENT DOCUMENTS 2856150 7/1979 Fed. Rep. of Germany .
3613800 10/1987 Fed. Rep. of Germany .
8606510 5/1986 France .
142221 5/1985 PCT Int'l Appl. .

OTHER PUBLICATIONS

European Search Report dated 24 Apr. 1990.

Primary Examiner—Parshotam S. Lall
Assistant Examiner—V. Trans
Attorney, Agent, or Firm—Kane, Dalsimer, Sullivan, Kurucz, Levy, Eisele and Richard

[57] ABSTRACT

A system for automatically controlling a motor vehicle drive unit, which system comprises a hydraulic actuating unit for actuating a control member controlling selection and engagement of the gears on the vehicle transmission; a hydraulic actuator for actuating a control member controlling the clutch; and an electronic control system for processing input signals relative to operating parameters of the drive unit and vehicle in general, and for controlling the actuators to varying degrees of automation. In particular, the control system produces variable control signals for respective porportional solenoid valves controlling the actuators, so as to vary hydraulic supply to the actuators and consequently the actuating force of the same, for simulating operation by a skilled driver; the aforementioned control system also providing, when shifting gear, for controlling the speed of the engine so as to minimize slippage of the clutch.

11 Claims, 1 Drawing Sheet

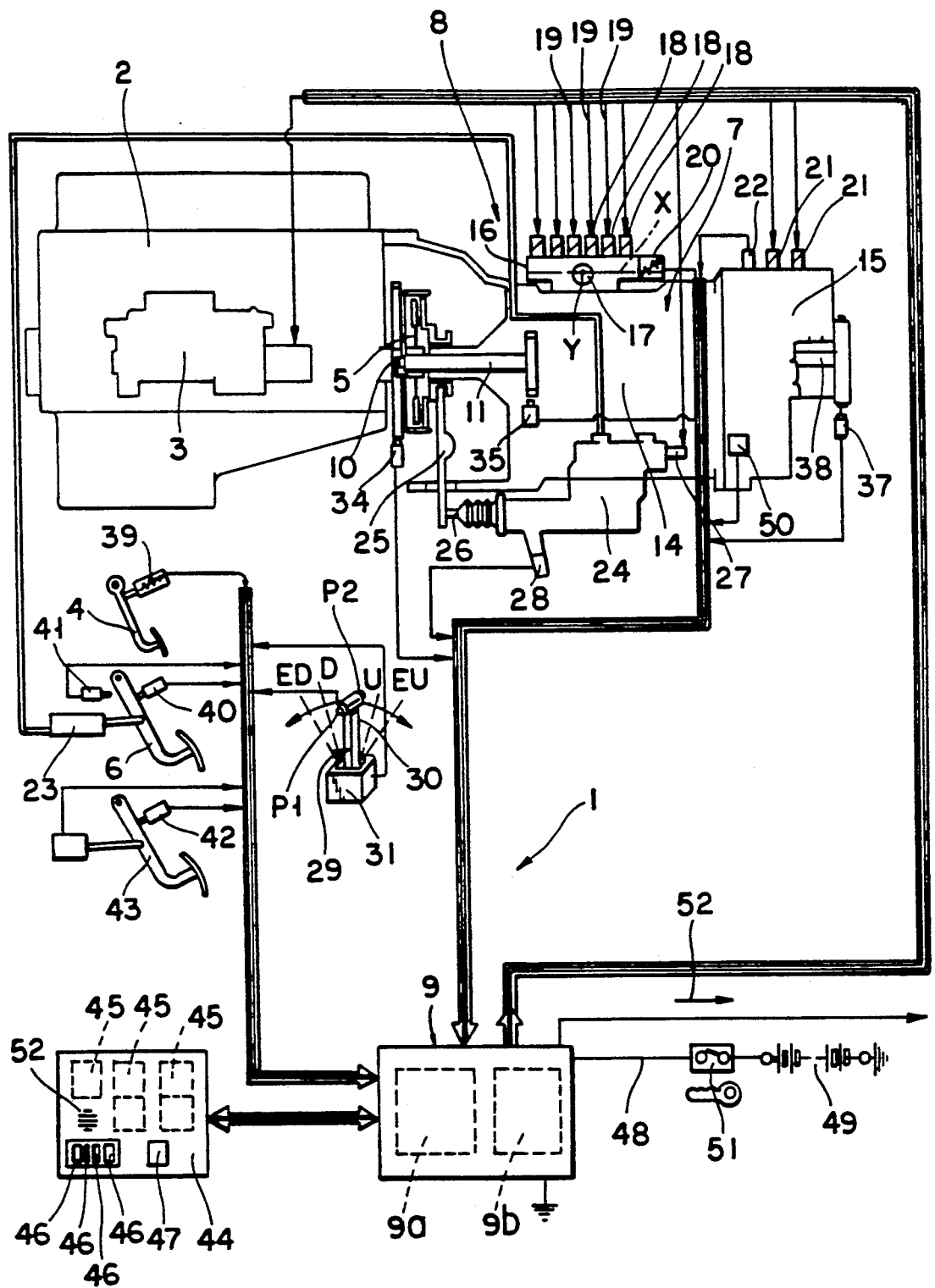

5,095,434

MOTOR VEHICLE DRIVE CONTROL SYSTEM

BACKGROUND OF THE INVENTION

The present invention relates to a system for automatically controlling the drive of a motor vehicle, particularly an industrial vehicle, and enabling the mechanical components of the drive to be controlled in various modes, to varying degrees of automation, and via the application of forces varying gradually according to predetermined laws.

Known systems for automatically controlling vehicle transmissions and clutches comprise first hydraulic or pneumatic actuating means, controlled by respective solenoid valves, for controlling a gear shift control member; and second actuating means, also controlled by a respective solenoid valve, for controlling a clutch engagement and release member; said solenoid valve being activated by electric signals produced by a control system.

Control systems of the type briefly described above present a number of drawbacks.

Firstly, gear shifting and clutch engagement and release are effected fairly sharply, thus resulting in undue stress on the transmission components (especially any synchronizers on the transmission) and clutch components (rapid wear of friction surfaces), and in undue dynamic stress being transmitted to the vehicle whenever either of said operations is performed. This is due to the fact that the forces transmitted to the transmission and clutch control members during operation of the same do not vary in the same manner as when said operations are performed manually by a skilled driver. Moreover, such systems provide for substantially achieving only one transmission and clutch operating mode, consisting in automatically controlling, via said actuators, both the transmission and clutch, regardless of the vehicle operating conditions involved.

It follows therefore that complete automation may prove entirely satisfactory under certain driving conditions whereas, under others, manual clutch release and engagement may be preferable, as when shifting gears under particularly difficult driving conditions, or when driving fully loaded over uneven terrain or slippery road surfaces.

SUMMARY OF THE INVENTION

The aim of the present invention is to provide a vehicle drive control system designed to overcome the drawbacks typically associated with known systems of the aforementioned type.

With this aim in view, according to the present invention, there is provided a system for automatically controlling a vehicle drive comprising a transmission having at least a control member for selecting and engaging a number of gears, and a clutch for connecting the input shaft of said transmission to the drive shaft and having a clutch engagement and release member; said system comprising:

first hydraulic actuating means for activating said transmission control member;
first electromagnetic valve means for controlling hydraulic fluid supply to said first actuating means;
manual gear selecting means;
transducer means connected to said manual gear selecting means;
second hydraulic actuating means for activating said clutch control member;
second electromagnetic valve means for controlling hydraulic fluid supply to said second actuating means;
a pedal for manually controlling said second actuating means;
means for detecting a number of operating parameters relative to the engine and said drive; and
an electronic control system for receiving signals from said detecting means and supplying control signals to at least said first and second valve means; said system being characterised by the fact that said first and second valve means are controlled proportionally; said electronic control system being designed to produce signals for controlling said first and second valve means and varying according to predetermined laws so as to vary the forces activating said actuating means during operation of the same; said electronic control system also being designed to control said system in at least two operating modes: a first mode wherein said electronic control system activates said first valve means subsequent to receiving at least one gear shift signal from said transducer means connected to said manual gear selecting means, said second valve means being substantially inoperative and said second actuating means being controlled by said pedal; and a second mode wherein, at least when shifting gear with the vehicle in motion, said electronic control system automatically activates said first and second valve means subsequent to receiving at least one gear shift signal from said transducer means connected to said manual gear selecting means.

BRIEF DESCRIPTION OF THE DRAWING

A preferred embodiment of the present invention will be described by way of example with reference to the accompanying drawing showing an operating diagram of the same.

DETAILED DESCRIPTION OF THE INVENTION

Number 1 in the accompanying drawing indicates a system for controlling the drive unit 8 of an industrial vehicle.

Said unit 8 is connected to an internal combustion engine 2 having an injection pump 3 operated by accelerator pedal 4, and substantially comprises a clutch 5 operated by clutch pedal 6, and a transmission 7, both of which are standard types and therefore not described in detail herein. Said clutch 5 is designed to angularly connect a drive shaft 10 to the input shaft 11 of transmission 7.

System 1 is designed to control transmission 7, clutch 5 and possibly also injection pump 3 to varying degrees of automation.

In particular, system 1 comprises a programmable electronic control system 9 comprising memorising means 9a and processing means 9b, and designed to receive electric signals relative to various operating parameters of unit 8 and other vehicle components, to process said signals, and to produce control signals for actuating means governing the components of said unit 8 as described hereinafter.

Transmission 7 comprises a synchronized main stage 14 series connected to a range multiplier 15. This is a purely arbitrary structure, however, which may equally well consist of a single stage without the range multiplier.

Gear selection and engagement in main stage 14, which defines a number of forward and at least one reverse ratio, are conveniently effected by a hydraulic actuator unit 16.

Said actuator unit 16 is conveniently of the type described in Italian Patent Application n.67946-A/88 filed by the present Applicant on 21 October 1988 and entitled: "Hydraulic actuator unit for controlling gear selection and engagement of a mechanical motor vehicle transmission", the content of which is incorporated herein purely by way of reference as required.

In particular, actuator unit 16 is designed to set a control member 17 to any one of a number of X axis gear range selection settings, and to any one of a number of Y axis gear engagement settings. For this purpose, actuator unit 16 comprises a pair of multiple-position hydraulic actuators (not shown) governed by a number of proportionally controlled solenoid valves 18 in turn controlled by electronic control system 9 over respective leads 19. X and Y axis displacement of control member 17 is detected by conventional transducer means 20 connected to electronic control system 9. Solenoid valves 18 are designed to regulate hydraulic fluid supply to the actuators, for varying the operating forces exerted on control member 17 along the X and Y axes as a function of electric signals from control system 9.

Selection and engagement of the drive ratios on range multiplier 15 are effected via conventional hydraulic actuating means (not shown) governed by solenoid valves 21 in turn controlled by control system 9. A detector 22, for detecting the position of said means activating range multiplier 15, is connected to control system 9 to which it supplies electric signals indicating the engaged drive ratio.

Unit 8 also comprises a hydraulic actuator 24 for applying force on and displacing a control member 25 governing release and engagement of clutch 5. Control member 25 conveniently consists of a lever, one end of which cooperates with a rod 26 on actuator 24, which is controlled by a proportional solenoid valve 27 for regulating hydraulic fluid supply to the actuator and so varying the applied operating force as required.

A suitable actuator and electromagnetic valve for the system according to the present invention are described in Patent Application n.64948-A/88 filed by the present Applicant on 21 October 1988 and entitled: "Hydraulic actuator for a motor vehicle clutch", the content of which is incorporated herein purely by way of reference as required. Means 28 are provided for detecting and generating electric signals proportional to the displacement of control member 25, said means conveniently consisting of a detector 28 with a feeler (not shown) cooperating with a portion of rod 26. Solenoid valve 27 and detector 28 are connected to control system 9, which supplies solenoid valve 27 with electric signals varying according to a predetermined law during displacement of rod 26, so as to vary the operating force applied on control member 25 as required.

Hydraulic actuator 24 governing clutch 5 may also be controlled hydraulically in known manner by a pump 23 controlled by clutch pedal 6.

System 1 also comprises a selector 29 for controlling gear selection on transmission 7 manually. Selector 29 is conveniently of the type described in Italian Patent Application n.67404-A/89 filed by the present Applicant on 26 May 1989 and entitled: "Gear selection and engagement device for an automatic motor vehicle transmission", the content of which is incorporated herein purely by way of reference as required.

In particular, selector 29 comprises a lever 30, and transducer means 31 connected to and supplying control system 9 with electric signals indicating the position of lever 30. This is normally positioned centrally by elastic means (not shown), and may be set manually to two opposite positions: U (up) and D (down), wherein transducer means 31 generate signals for selecting and engaging the next gear up or down in relation to the one currently engaged. Lever 30 may also be set to a further two so-called "overtravel" positions: EU (extra-up) and ED (extra-down), located opposite each other in relation to the central position, involving greater excursion of the lever and greater manual effort as compared with positions U and D, and wherein transducer means 31 produce further signals processed by control system 9 as described later on.

Lever 30 also presents two push-buttons P1 and P2, operation of which, possibly in combination with lever 30, transmits enabling signals to control system 9 which in turn transmits control signals to the actuators of transmission 7 and clutch 5. That is to say, when button P1 is operated, transmission 7 is set to neutral; when button P2 is operated simultaneously with lever 30 (U or D position), a control signal is issued for selecting and engaging the next but one gear up or down in relation to the one currently engaged; when button P2 is operated simultaneously with lever 30 (D position) with the vehicle at a standstill, the reverse gear is engaged.

Control system 1 also comprises a number of detectors for detecting the operating parameters of unit 8 and the vehicle in general, and comprising:

sensor 34 for detecting the speed of drive shaft 10;
sensor 35 for detecting the speed of input shaft 11 of transmission 7;
sensor 37 for detecting the speed of output shaft 38 of transmission 7;
transducer 39 for detecting the travel of accelerator pedal 4;
travel start switch 40 relative to clutch pedal 6;
end of travel switch 41 relative to clutch pedal 6;
switch 42 indicating operation of brake pedal 43;
transmission oil temperature sensor 50.

System 1 also comprises a control panel 44 conveniently located on the dashpanel and featuring a number of indicators 45, e.g. indicator lights and alphanumeric indicators, and a number of push-buttons 46 for selecting various system 9 parameter processing routines, each with its own control logic (e.g. "economic", "sustained", etc.). Provision is also made for a buzzer 52 connected to control system 9, the function of which will be explained later on. Panel 44 also presents an on-off button 47 for activating the automatic operating mode of unit 8, as described in more detail later on.

The hydraulic actuators on system 1 are connected to a pressurized fluid supply source (not shown), for example, of the type described in Italian Patent Application n.67947-A/88 filed by the present Applicant on 21 October 1988 and entitled: "Air-powered pressurized oil supply and storage unit."

Control system 9 is supplied over a lead 48 connected to the vehicle battery 49 by a key-operated switch 51.

System 1 operates in three modes ranging from manual to fully automatic operation of drive unit 8:

A - Manual mode: Though servoassisted, gear shift and clutch operation are controlled exclusively by the driver using lever 30 and clutch pedal 6. This mode is particularly recommended when driving over rough ground.

B - Semiautomatic mode: Gear shift is servoassisted but controlled manually as for mode A); clutch release and engagement are controlled automatically by control system 9 when shifting gear, but using the clutch pedal when starting the vehicle from a standing position. This mode is recommended when driving over normal road surfaces, but when special care is called for at the pull-away stage, e.g. as when transporting exceptionally heavy loads, or maneuvering the vehicle in a manner requiring careful clutch control.

C - Automatic mode: the clutch is controlled by system 9 both at the pull-away stage and when shifting gear. Gear shift is controlled directly by system 9 according to accelerator and brake position data, vehicle operating status as detected by the aforementioned sensors, and the control logic of the selected processing routine. This operating mode is recommended when driving over fairly normal rod surfaces.

The basic operating statuses controlled by system 9 may be classified according to the following functions:
1) Starting and stopping the engine;
2) Gear shift;
3) Clutch control.

The following is a detailed description of the above three functions and the differences encountered as a function of the operating mode selected.

1) Starting and stopping the engine

Closure of key-operated switch 51 provides for supplying and activating system 9, which commences cyclic reception of all the aforementioned input signals, provides for topping up the stored hydraulic fluid level, and indicates, via indicators 45, the operating status of the system and which gear, if any, is engaged. System 9 also produces a signal 52 for enabling start-up of engine 2 when the following conditions are met simultaneously: engine off (as detected by sensor 34) and no traction (transmission in neutral or clutch released—as detected by transducer means 20 and 28).

The engine is stopped by opening key-operated switch 51, which only de-activates system 9 if the vehicle is stationary and all the current operations have been completed.

2) Gear shift

In manual operating mode A, gear selection and engagement are effected manually by the driver using lever 30, and gear shift is dependent upon the following conditions: manual request via lever 30 (transmitted to system 9 by transducer means 31); clutch pedal fully depressed (indicated by switch 41); resulting drive shaft 10 speed within an acceptable range, to prevent too high a speed damaging the engine or too low a speed stalling it. The latter condition is determined by system 9, which calculates a "theoretical" speed of drive shaft 10 on the basis of the output speed of transmission 7 (detected by sensor 37) and the selected drive ratio, which theoretical speed is compared with a maximum and minimum value stored in system 9 itself. As already stated, selection and engagement of the next gear up or down in relation to the one currently engaged are achieved by setting lever 30 to the U or D position. The same operation accompanied by operation of button P2 provides for selecting and engaging the next but one gear up or down in relation to the one currently engaged. The function of buttons P1 and P2 is a already described.

The EU and ED settings of lever 30 enable two gear shift functions which are particularly useful under certain driving conditions.

When lever 30 is set to the EU position, system 9 provides for shifting gear in substantially the same way as for the U position, except that the various stages involved (described in detail later on) are performed at greater speed. This function is particularly useful, for example, when driving up steep slopes, for preventing a rapid fall in vehicle speed when shifting gear. If down-shifting is not permitted, on the grounds that the resulting engine speed would be above said predetermined maximum value, a down-shift may be performed in an emergency by setting lever 30 to the ED position, providing the resulting engine speed does not exceed the mechanical resistance of the engine. Upon engagement of the gear, buzzer 52 is sounded for enabling release of clutch pedal 6 by the driver. Operating mode B is the same as A as regards gear shifting with the vehicle in a standing position. With the vehicle in motion, however, i.e. when the output speed of the transmission detected by sensor 37 exceeds a conveniently low threshold, gear shifting is performed exclusively by means of lever 30, with no assistance from clutch pedal 6. Once the manual request from the driver, i.e. the resulting engine speed, is approved, system 9 controls actuator 24 for rapidly releasing clutch 5, after which, the gear is shifted (by switching solenoid valves 18, 21). System 9 then controls actuator 24 for gradually engaging clutch 5 in much the same way as an expert driver. When shifting gear, system 9 also provides for controlling injection pump 3. That is, as clutch 5 is released, system 9 reduces supply to engine 2 to minimum, and, as clutch 5 is engaged, it regulates supply to engine 2 so as to adapt the engine speed, if necessary, to the input speed of transmission 7 (detected by sensor 35) and so minimise slippage of clutch 5 during engagement and consequently also wear on the friction surfaces of the same. In other words, as the speed of input shaft 11 of transmission 7 is reduced when shifting to a higher gear, engine 2 is kept at minimum speed. Conversely, as the speed of input shaft 11 of transmission 7 is higher than the minimum speed of engine 2 when shifting to a lower gear, supply to engine 2 is increased for accelerating drive shaft 10. At this point, system 9 gradually restores control of engine supply to the driver via accelerator pedal 4.

In automatic mode C, pull-away shifting is also performed fully automatically by system 9 with no assistance from the driver using lever 30. The "decision" to shift gear is made exclusively by system 9 on the basis of data relative to the speed of drive shaft 10 (sensor 34), the position of accelerator pedal 4 (transducer 39), the position of the brake pedal (switch 42), the control logic selected by buttons 46, and any other vehicle operating parameters received and processed by system 9 (e.g. vehicle load, gradient, etc.).

Apart from the initial command, which is controlled exclusively by system 9, actual shifting is performed in the same way as for mode B; supply to engine 2 also being controlled by system 9 when shifting gear.

Switching from mode A to B and vice versa is automatic. That is, the system operates in either mode, depending on whether or not clutch pedal 6 is operated by the driver for shifting gear once the vehicle is in motion.

Button 47 is operated for switching to mode C, which is exactly the same as mode B if lever 30 is operated by the driver, and the same as mode A if clutch pedal 6 is depressed. In mode C, the driver can still choose when to shift gear and which gear to shift to, provided this conforms with the engine speed requirements already mentioned. In other words, button 47 provides for operating system 1 in two ways, each providing for various operating modes, depending on the manual control members operated by the driver. When set to OFF, button 47 enables modes A and B, and the system functions in either mode depending on whether or not the clutch pedal is operated by the driver. When set to ON, button 47 enables modes A, B and C, and the system functions in any one of these modes depending on whether lever 30 or clutch pedal 6 is operated by the driver.

Regardless of which mode A, B or C is operative, gear shifting in main stage 14 of transmission 7 is performed as follows:
- release of the engaged gear by operating solenoid valves 18;
- constant-load selection of the new range by activating respective solenoid valve 18 via a constant electric signal;
- variable-load engagement of the new gear.

The latter operation is performed by system 9 modulating the enabling signals of solenoid valves 18 controlling engagement of the new gear, and consequently the hydraulic pressure controlling the respective actuating means, for controlling synchronization and subsequent engagement under optimum load conditions, as a function of the actuating travel signals produced according to laws stored in system 9 and depending on the input signals relative to the engaged gear, speed, transmission oil temperature and any other significant parameters.

Said laws substantially simulate the sensitivity of a skilled driver.

If shifting gear also involves a switch in range, this is effected alongside gear selection in main stage 14. Only when both these operations have been completed is the new gear engaged.

3) Clutch control

In mode A, operation of clutch 5 is pedal-assisted. In mode B, and only with the vehicle in motion, operation of clutch 5 is automatic. That is, system 9 controls actuator 24 for rapidly releasing clutch 5, and, once the new gear is engaged, for engaging it, first rapidly, to the point at which slippage commences, and then gradually as a function of the travel detected by transducer 28 according to laws stored in system 9 and depending on the input signals relative to the speed of drive shaft 10 (sensor 34) and input shaft 11 of transmission 7 (sensor 35).

In mode C, clutch 5 is also operated automatically at the pull-away stage, in which case, the transmitted torque is modulated by system 9 supplying solenoid valve 27 of actuator 24 with a variable electric signal, on the basis of the instantaneous value of the engine and transmission input speed signals, and a reference value for said signals defined by system 9 as a function of the position of accelerator pedal 4 (detected by transducer 39).

Each time the engine is started, system 9 provides for engaging clutch 5, in the course of which, it detects (via sensor 28) and memorises the point at which clutch 5 commences actual engagement. This is later employed for performing said rapid approach portion of all subsequent clutch engagement operations (pull-away and gear shift).

The advantages of system 1 according to the present invention will be clear from the foregoing description. Firstly, system 1 provides for automatic, variable-load gear and clutch control simulating that of a skilled driver, thus minimising wear on the transmission and clutch members and any dynamic stress on the vehicle resulting from operation of the same. Moreover, system 1 provides for various degrees of automation selectable by the driver who may thus assume direct control whenever vehicle load or road conditions so require. Finally, automatic control of engine speed when shifting gear provides for minimising slippage and drastically reducing wear on the clutch.

To those skilled in the art it will be clear that changes may be made to the system as described and illustrated herein without, however, departing from the scope of the present invention.

For example, system 9 may be programmed to perform modes A and B only, if complete automation of the drive unit is not required. Also, in lieu of or in addition to mode C, provision may be made for an operating mode enabling automation to a degree halfway between that of B and C, i.e. wherein clutch control is also fully automatic at the pull-away stage, whereas gear shifting is controlled manually by the driver.

Changes may also be made to the embodiments of the actuators as described herein, to the functions performed by gear selection lever 30, and to the number and arrangement of the sensors.

We claim:

1. A system for automatically controlling a vehicle drive unit comprising a transmission having at least a control member for selecting and engaging a number of gears, and a clutch for connecting the input shaft of said transmission to the drive shaft and having a clutch engagement and release member; said system comprising:
   first hydraulic actuating means for activating said transmission control member;
   first proportionally controlled electromagnetic valve means for controlling hydraulic fluid supply to said first hydraulic actuating means;
   manual gear selecting means;
   transducer means connected to said manual gear selecting means;
   second hydraulic actuating means for activating said clutch control member;
   second proportionally controlled electromagnetic valve means for controlling hydraulic fluid supply to said second hydraulic actuating means;
   a pedal for manually controlling said second hydraulic actuating means;
   detecting means for detecting a number of operating parameters relative to the engine and said drive, comprising at least one transducer means for detecting and producing electric signals proportional to displacement of said member controlling said transmission, and transducer means for detecting and producing electric signals proportional to displacement of said member controlling said clutch;
   an electronic control system for receiving signals from said detecting means and supplying control signals to at least said first and second proportionally controlled electromagnetic valve means;
   said electronic control system comprising elaborating means for generating variable signals controlling said first and second proportionally controlled electromagnetic valve means as a function of said signals received from said transducer means detecting displacement of said control members so as to vary the forces activating said hydraulic actuating means and memorizing means, said variable signals controlling said first and proportionally controlled electromagnetic second valve means being processed by said elaborating means according to predetermined laws stored in said memorizing means and the governing processing of said control signals depending on input signals supplied to said electronic control system by further operating parameter detecting means; and said electronic control system having at least two operating modes: a first mode wherein said elaborating means activates said first proportionally controlled electromagnetic valve means subsequent to receiving at least one gear shift signal from said transducer means connected to said manual gear selecting means, said second proportionally controlled electromagnetic valve means being substantially inoperative and said second hydraulic actuating means being controlled by said pedal; and a second mode wherein, for every gear shift at least with the vehicle in motion, said elaborating means automatically activates said first and second proportionally controlled electromagnetic valve means subsequent to receiving at least one gear shift signal from said transducer means connected to said manual gear selecting means.

2. A system as claimed in claim 1, wherein said operating parameter detecting means comprise at least a sensor for detecting the speed of said drive shaft, and a sensor for detecting the speed of said input shaft of said transmission.

3. A system as claimed in claim 2, wherein, at least in said second operating mode, said electronic control system provides, when shifting gear, for controlling a means supplying said engine in such a manner as to minimize supply when said clutch is released, and, while said clutch is released and on the basis of input signals from said speed sensors, to increase supply for adapting the speed of said drive shaft to that of said input shaft of said transmission, if said speed of said drive shaft is below that of said input shaft of said transmission.

4. A system as claimed in claim 1, wherein said electronic control system is programmed such that said control signals supplied to said proportionally controlled electronic valve means provide for varying said actuating forces produced by said actuating means.

5. A system as claimed in claim 1, wherein said electronic control system provides for controlling said system in at least a third operating mode, wherein said electronic control system, on the basis of input signals received from said detecting means detecting the operating parameters of said engine and said drive unit, and on the basis of at least one predetermined law governing processing of said input signals and memorized in said electronic control system, produces control signals controlling said first and second proportionally controlled electromagnetic valve means for automatically shifting gear and releasing and engaging said clutch.

6. A system as claimed in claim 5, wherein, in said third operating mode, said electronic control system provides, when shifting gear, for controlling said means supplying said engine, in such a manner as to minimize supply when said clutch is released, and while said clutch is released and on the basis of input signals received from said speed sensors, to increase supply for adapting the speed of said drive shaft to that of said input shaft of said transmission, if the speed of said drive shaft is below that of said input shaft of said transmission.

7. A system as claimed in claim 5, wherein comprises means for manually selecting from a number of control logic, and designed to supply said electronic control system with signals governing the processing of input data and memorized in said control system (9).

8. A system as claimed in claim 5, wherein said comprises means for manually enabling said third operating mode of said electronic control system.

9. A system as claimed in claim 1, wherein said manual gear selecting means comprise a lever normally maintained in a central position, and which may be set manually to a first (U) or second (D) position opposite each other in relation to said central position; said transducer means connected to said lever being designed to supply said electronic control system with respective signals for selecting and engaging a higher or lower gear when said lever is set to said first (U) or said second (D) position respectively.

10. A system as claimed in claim 9, wherein said detecting means also comprise a sensor for detecting the speed of the output shaft of said transmission; said electronic control system providing for processing the input data from said sensor detecting the speed of said output shaft of said transmission and from said transducer means connected to said lever, for calculating the theoretical speed of engine resulting from engagement of the selected gear, and for disabling engagement if said theoretical speed does not fall within a predetermined maximum and minimum speed range.

11. A system as claimed in claim 10, wherein said lever may be set to a third (EU) and fourth (ED) position opposite each other in relation to said central position and involving greater exclusion of said lever and greater manual effort as compared with said first (U) and second (D) positions; said transducer means supplying said electronic control system with an enabling signal for shifting gear and operating clutch in the same manner as for said first position (U), but at greater speed, when said lever is set to said third position (EU), and supplying said control system with an enabling signal for also shifting gear if said theoretical speed exceeds said maximum limit, when said lever is set to said fourth position (ED).

* * * * *